July 18, 1950 M. K. KUNINS 2,515,236
COLORED LIGHT SOURCE
Filed Feb. 11, 1944 2 Sheets-Sheet 1

Morris Kamm Kunins INVENTOR.

BY
Attorney

July 18, 1950

M. K. KUNINS 2,515,236

COLORED LIGHT SOURCE

Filed Feb. 11, 1944

2 Sheets-Sheet 2

Morris Kamm Kunins INVENTOR.

BY

Attorney

Patented July 18, 1950

2,515,236

UNITED STATES PATENT OFFICE 2,515,236

COLORED LIGHT SOURCE

Morris Kamm Kunins, Bronx, N. Y.

Application February 11, 1944, Serial No. 522,026

8 Claims. (Cl. 240—3.1)

My invention relates to colored light sources and has for its object to provide a new and improved means for producing colored light of any hue, more particularly to provide a light source the color of which may be controlled or adjusted in any manner desired and to suit existing requirements.

Light sources of this type have various uses, in the home and in the commercial field. In the home, such devices may be used for decorative as well as physiological purposes. In the commercial field, application may be made for display purposes in advertising as well as in the theatre. These examples of application of this invention are not to be regarded in a limiting sense, but rather as illustrative of a few fields of its practical use.

Accordingly, a further object of this invention is to provide a simple variable color light source of the above character which is easy to operate, cheap to manufacture and capable of providing light of either the diffused or directed (spot light) type, the color of which may be continuously varied to obtain any hue or mixture of hues within the visible spectrum.

With the foregoing objects in view, this invention contemplates the use of a plurality of component light sources, preferably three sources of red, green and blue light or any other number of complementary primary color light sources. Said sources are caused to emit variable amounts of their individual hues to obtain the composite colors that result therefrom. The colors thus obtained may be of any desired wavelength or range of wavelengths within the visible spectrum. The control device to be described herein in conjunction with the colored component light sources is so constructed as to permit a substantially gradually adjustable variation of the composite color by operating a single control member or to enable a continuously variable program of color variation that is ever changing by the use of a motor or other driving source.

Figure 1:
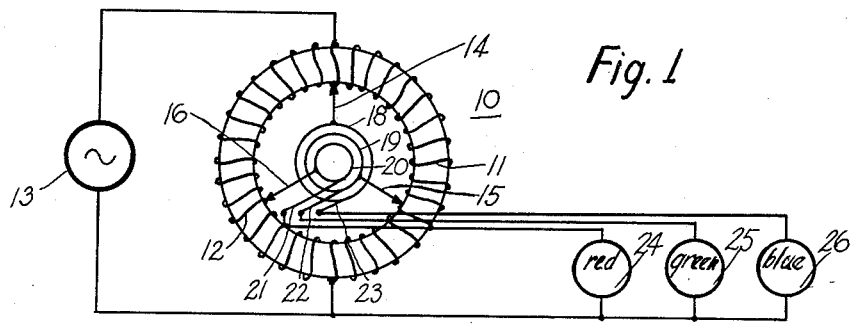
Figure 2A:
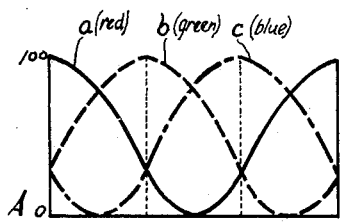
Figure 2B:
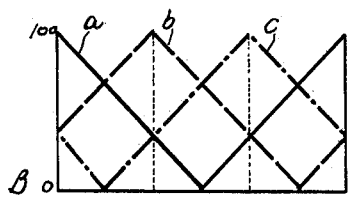
Figure 2C:
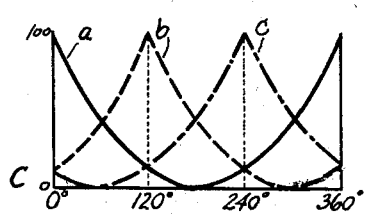
Figure 3:
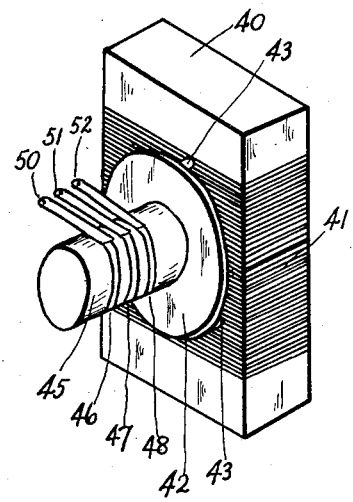
Figure 4:
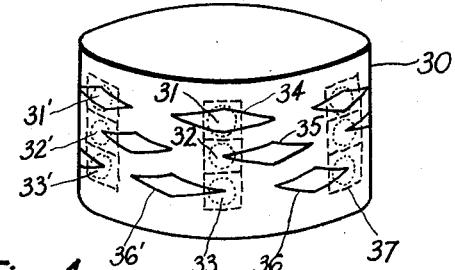
Figure 5:
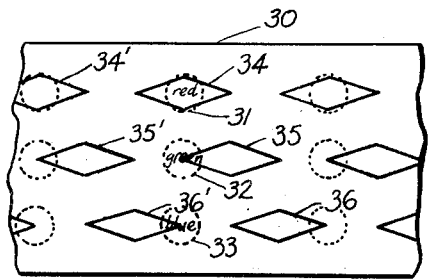
Figure 5A:
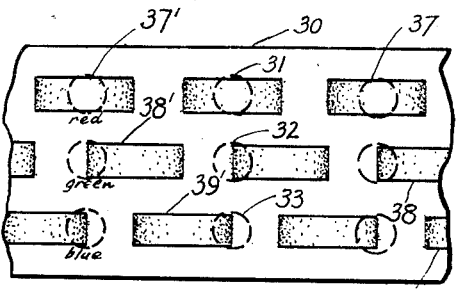
Figure 7:
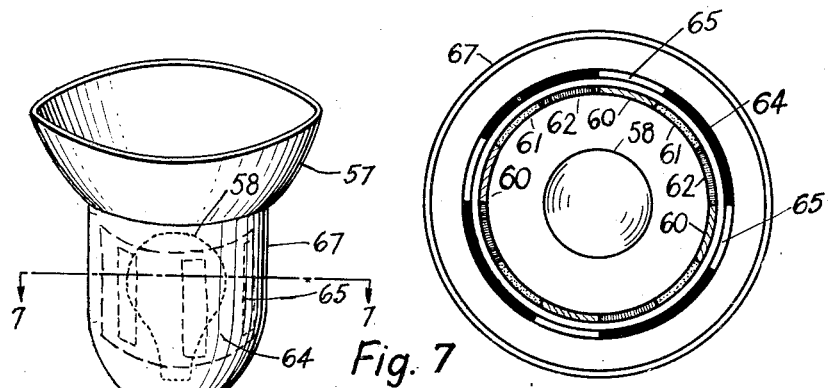
Figure 6:
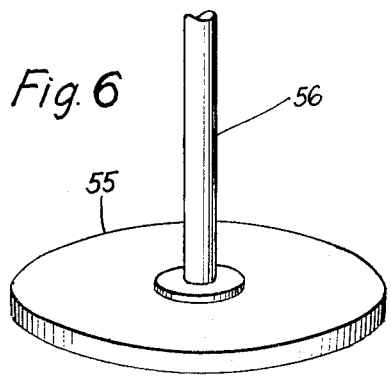

My invention will become more apparent from the following detailed description taken in reference to the accompanying drawings forming part of this specification and wherein:

Figure 1 is a schematic circuit diagram of one form of electrical light control system embodying the principles of the invention; Figures 2A, 2B and 2C illustrate various modes of variation of the individual light sources for the attainment of various combinations and light effects; Figure 3 is a perspective view of a practical construction of the control device shown in Figure 1; Figure 4 illustrates an arrangement according to the invention using mechanical means for effecting the light control; Figure 5 shows part of the cylindrical shutter of Figure 4 in spread out or developed condition; Figure 5A shows a modification of a control device of the type according to Figure 5; Figure 6 illustrates a floor lamp embodying an alternative light control system; and Figure 7 is a cross-section taken on line 7—7 of Figure 6.

Like reference numerals identify like parts throughout the different views of the drawings.

In the attainment of the objectives of my invention, according to one embodiment, I provide an autotransformer or resistance potentiometer so arranged that two or more separate voltages for energizing respective light sources of primary colors or hues are tapped off therefrom by means of two or more slideable contacts spaced at definite intervals relative to each other. One particular instance of this arrangement utilizes an autotransformer wound on a toroidal core with three independent contacts spaced 120° apart and so mounted as to be simultaneously slideable over the transformer winding whereby any of the contacts may be connected to any point along the entire autotransformer winding in continuously variable fashion.

As will be seen by reference to Figure 1, the winding of an iron-core autotransformer 10 comprises two sections 11 and 12 each of which occupies 180° of the toroidal core supporting said winding. The paralleled winding sections 11 and 12 are connected to a suitable input source 13 of electrical power such as a normal power or house lighting circuit. The slideable contacts 14, 15 and 16 displaced by 120° connect to the external or output circuits by way of three insulated brushes 21, 22 and 23 and slip rings 18, 19 and 20 in the manner shown and well understood by those skilled in the art. The external circuits include three electric lamps 24, 25 and 26 or banks of lamps, each individual bank emitting its own characteristic primary colored light, red, green or blue, respectively, as indicated in the drawing.

All three contacts, 14, 15 and 16 are mounted upon the same shaft or other operating member, whereby rotation of the shaft will cause each of the contacts to traverse the length of the autotransformer winding simultaneously at a rate that will cause the individual output voltages from each of the three brushes, 21, 22 and 23 to vary much in the manner of a three phase electrical system. Thus, varying voltages are applied in relative phase displacement to each of the three sources of primary color lights. Mixture of these varying combinations of primary colors will result in any of the many shades of color within the range of the visible spectrum. This resulting color of the combination of various primary color intensities may be controlled manually and fixed by adjusting the control shaft to a predetermined position or may be continuously changed by a motor drive or in any other suitable manner.

It is a well known fact that the mixture of lights of the three primary colors, red, green and blue, or the complementary colors thereof, will furnish other component colors of appropriate hue depending upon the proportioning of the intensities of the primary colors. For instance, to achieve a yellow color from the primary colors, red and green light is mixed. The exact shade of yellow light obtained depends upon the relative intensities of the original mixing colors. If the red light were to be of greater intensity than the green light, an orange yellow would result and if the green light were to be of greater intensity than the red light, a lemon yellow would result. The entire gamut of gradation between the relative intensities of the red and green lights will produce any of the various shades of yellow that appear in the visible spectrum. Likewise, mixture of red and blue light will produce any of the purples that exist in the spectrum and mixture of green and blue will produce any shade of greenish blue. Of course, the primary colors alone will produce the pure primary colors themselves.

This mixture of lights is accomplished by my invention in an easy and simple manner. The rotary variable contacts mentioned above distribute varying amounts of electrical voltage to each of the colored lights corresponding to the position of the respective contacts on the auto-transformer winding which will be further understood by referring to Figure 2A. In the latter, the curves $a$, $b$ and $c$ represent the output voltages assumed to be sinusoidal and serving to energize the red, green and blue lamps, respectively, the maximum peak values being designated as 100% in the drawing. The abscissae represent the position or angle of the control device or color adjuster with respect to a normal or zero position.

Thus, in one position the blue contact will be located at the end of the autotransformer winding which corresponds to zero voltage being applied to the blue lamp or light source. Since the contacts are displaced by 120° relative to each other, the red and green contacts will find themselves on that portion of the winding corresponding to about ¾ of maximum voltage. Thus, equal amounts of red and green light would be available for mixing into a yellow light of proportionate wavelength or range of wavelengths.

If a clockwise rotation of the control handle of 120° is made and the red light contact is now at the zero voltage point on the autotransformer winding, the green and blue light contacts will be at about ¾ of maximum voltage resulting in equal admixture of these two primary colors and attainment of a blue-green color midway between these two primaries within the spectrum range, the red lamp being extinguished with no voltage applied to it. Further rotation of the control handle 120° in a clockwise direction will result in no green light and the admixture of the blue and red lights operated each at about ¾ maximum voltage. A shade of violet will result from this combination which is midway between the red and blue in the visible spectrum range.

Although a sinusoidal manner of varying the circuit voltages as shown in Figure 2A will result in a satisfactory color control or change in hues, in view of the exponential manner of change of emitted light from an incandescent source with voltage, other manners of varying the circuit voltages may be contemplated by this invention. Thus, by means of elliptical gearing between the control knob and contact device, an approach to a saw-tooth like shape of the controlling voltages may be obtained as shown in Figure 2B. Furthermore, by means of cardioid gearing between the control knob and the contact device, an approach to a cycloidal variation of the circuit voltages will be obtained as shown in Figure 2C. These effects may also be achieved by suitably spacing the turns of the auto-transformer windings in place of the mechanical gearings mentioned above. For instance, an effect equivalent to elliptical gearing may be obtained by concentrating more turns per inch of core winding on the top and bottom of each parallel section and by gradually reducing this concentration towards the middle. The cardioid gearing effect may be achieved by concentrating the windings at the top only and gradually reducing the concentration towards the opposite end. In this case, the concentration of the windings on both halves of the core should be made at similar ends of both windings.

In an arrangement of the type aforedescribed, the primary colors alone are obtained if the respective voltage is at its maximum or 100% value, in which case the remaining voltages will be at too low a value (about ⅓ of the maximum) to cause any appreciable light radiation due to the exponential relation between the supply voltage and light emission of the ordinary incandescent or other light source. Thus, considering curve $b$ in Figure 2A corresponding to the green light at the point of maximum intensity or 100%, the exciting voltages $a$ and $c$ corresponding to the red and blue lights, respectively, are of such a relatively small value as to be negligible, whereby to leave only the pure green light to be emitted by the respective lamp or light source. The same applies to the other primary colors, red and blue, as is readily understandable. This effect is the same if a linear voltage variation is employed as shown in Figure 2B, or by using other methods of variation, such as cycloidal variations, shown in Figure 2C. In Figure 3, I have shown a practical construction of light control device of the type embodied in Figure 1 for use in connection with the invention. The core 40 may be either of magnetic material if the device is constructed in the form of an auto-transformer or of insulating material if the device is used as a resistance potentiometer. In either case, the winding 41 is energized by a suitable current supply source and the output voltages are derived by the aid of three sliding contacts 43 displaced by angles of 120° and supported by a disc 42 carrying an operating shaft 45 of insulating material. The winding 41 is made of bare wire to effect a direct connection with the contacts 43, the latter being connected to slip rings 46, 47 and 48 cooperating with sliding contacts or brushes 50, 51 and 52, respectively. By an arrangement of this type the voltages between the brushes 50, 51 and 52 varying as a function of the rotating position of the shaft 45 in a manner substantially similar as described with reference to Figure 1 and shown in Figures 2A, 2B and 2C provided a proper spacing of the winding turns or the provision of suitable intermediate gears interposed between the shaft 45 and an operating knob or other control member.

Although the arrangement described may be used alone to control the variation of the light intensities of the various primary colors, it may also be used in conjunction with electronic tubes to obtain an amplified output from relatively small control voltages. In such an arrangement, the voltages obtainable from the autotransformer or resistance potentiometer described hereinabove and applied to the grid circuit of suitable electronic amplifier tubes for control of larger power in the plate or output circuit of the tubes. One or more electronic tubes may be connected to each bank of colored lamps for control of the color or wavelength in a manner readily understood by those skilled in the art.

It will be obvious that other than electrical means described hereinabove may be used to attain the object of the invention. Thus, according to a further embodiment of the invention, variable shutters, diaphragms, gray filters or other means suitably interrelated for controlling the light intensity of lamps may be utilized to accomplish the purpose of the invention.

One such construction is shown in Figures 4 and 5. In the latter, there are shown a multiplicity of lamps so arranged within a cylindrical apertured shutter or screen 30 that lamps 31, 31' ... ; 32, 32' ... ; and 33, 33' ... in a particular horizontal row radiate colored light of one particular primary hue. In the example shown, there are three horizontal rows of lamps, one row for each of the three primary colors: red, green and blue, as indicated in Figure 5. These rows of lamps may be separated horizontally by means of partitions 37 so that the light from a particular color does not extend into or mix with the light of either of the remaining primary colors until passing the screen or shutter 30. The screen is made of opaque material and is constructed with sets of apertures 34, 35 and 36 and 34', 35' and 36' etc. and for each set of colored lamps as shown and spaced or staggered at suitable intervals in such a manner that rotation of the screen causes the various positions of the apertures to control the amount of light radiation from the individual primary colors. These variable intensities of the different primary colors then blend together on a surrounding translucent surface or screen placed over the shutter 30 to result in any particular composite hue or color within the visible spectrum. The use of such a translucent screen as shown at 67 in Figure 6 to be described presently has the further purpose of rendering the primary radiations invisible and to reveal only the blended or composite colors. It will be seen from Figures 4 and 5, that the apertures are diamond shaped and staggered relative to each other in such a manner that the progressing tip of one row is coincident with the retrogressing tip of one of the rows of apertures at the same time that it is coincident with the widest portion of the aperture of the remaining row. Figure 5 shows a developed view of this screen and apertures. Though this screen is shown of cylindrical shape in Figure 4, it is obvious that other shapes may likewise be utilized for the purpose of this invention. Furthermore, the apertures are not to be restricted to the diamond shape but may be varied to obtain any final color variation desired. Apertures of suitable other shapes will result in different manners of light variation to suit any existing desires or requirements.

Furthermore, the apertures need not be restricted to openings of variable area and constant transparency. They may be of constant area and variable transparency in the form of variable density or gray filters. Figure 5A shows a screen of this latter type provided with variable transparent apertures, 37, 38 and 39 achieved by means of gray filters of varying density. By varying the density of the filters in a desired manner a color control is obtained similar to that according to the preceding exemplifications.

Though this specification has concerned itself heretofore with the production of any colored hue within the visible spectrum, it might also be applied e. g. to the production of any colored white light or generally to the mixing of a given number of light sources of definite hues to obtain any shade of combined light or color within a limited spectral range, to suit special requirements. It is a fact that different individuals find different qualities of white light best suited to their needs. Some for instance prefer a yellowish light, others a bluish light. By means of this invention, it is possible for an individual to control the quality of his "white" light by adding the proper amount of suitable blue or yellow illumination by means of a device described and readily understood from the above.

Thus, in the production of so-called artificial daylight, it is customary to mix light of a reddish hue obtained from a neon lamp with bluish light obtained from a mercury vapor lamp. According to the present invention, light of these and additional component hues may be controlled or adjusted in an easy manner to obtain any desired quality of artificial daylight illumination by means of a device of substantially the character described and readily understood from the foregoing.

Though this invention may be applied to any use and purpose where the need exists for colored or composite light or light of various blends within the visible spectrum, one example in the form of a household floor lamp is shown in Figures 6 and 7. This lamp comprises a base 55, a standard 56 supporting the reflector 57 and lamp structure which in the example shown is composed of an ordinary light bulb 58 surrounded by a multiple cylindrical shaped filter having adjacent sets of green, red and blue elements 60, 61 and 62 which act as secondary light sources in the same manner as if individual colored lamps were used. The filter structure is surrounded by a rotatable cylindrical shutter mounted in close proximity thereto and having alternate opaque portions 64 and apertures 65. The latter conform substantially to the shape of the filter elements and are spaced in such a manner as to obtain a mixed or blended light continuously varying in hue as the shutter is rotated in any suitable manner (not shown) as will be readily understood from the foregoing. Surrounding the shutter is a diffusing cylinder 67 to prevent the component primary colors from being directly visible and to reveal only the blended or composite hue or light. If desired, the reflector 57 may be provided with a similar colored blending device or may emit white light directed by the lamp 58, if desired. The narrower the individual filter elements and the more sets of filters used, the smaller will be the rotating angle required to obtain a variation within the spectral range and the more uniform will be the blend or mixture of the primary colors as is readily understood.

It will be evident from the foregoing that this invention is not limited to the specific details and constructions as well as steps disclosed and described herein for illustration, but that the underlying novel principle and thought are susceptible of numerous variations and modifications coming within the broader scope and spirit of the invention as defined in the appended claims. The specification and drawings are accordingly to be regarded in an illustrative rather than in a limiting sense.

I claim:

1. In a device of the character described, at least two identical sets of extended component color light sources, each of said sets comprising three differently colored and adjacently situated sources of substantially equal surface area with said sets arranged in closely following relation and with the colors of each set changing in like sequence, common shutter means arranged to intercept the light emanating from and relatively adjustable in the direction transverse to said sources, said shutter means having alternate light transmitting and light stopping areas of a width corresponding, respectively, to a single width and twice the width of one of said sources.

2. In a device as claimed in claim 1, including means for blending the light beams of varying color passing through said shutter means into light of composite hue.

3. In a device as claimed in claim 1, including light diffusing means in the path of the light passed through said shutter means.

4. In a device of the character described, a plurality of identical sets of filter elements, a source radiating light of composite color, said filter elements arranged in the path of the light emanating from said source, each of said sets comprising three differently colored and adjacently situated filters of substantially equal width with said sets being arranged closely adjacent to each other and with the colors of each set changing in like sequence, common shutter means arranged to intercept the light passed by and relatively adjustable in the direction transverse to said filters, said shutter means having alternate light transmitting and light stopping areas of a width corresponding, respectively, to a single and double the width of one of said filters.

5. In a device as claimed in claim 4, wherein said source emanates light of substantially white color and each of said sets consists of filters of red, blue and green color, respectively.

6. In a device as claimed in claim 4, including light diffusing means arranged in the path of the light passed through said shutter means.

7. In a device of the character described, a light source, a plurality of identical sets of filters arranged upon a cylindrical surface with said source in the center, each of said sets comprising adjacent red green and blue filters of equal width with the sets being arranged in closely adjacent relation and with the colors of each set changing in like sequence, a cylindrical rotatable shutter concentrically surrounding said filters and having alternate light transmitting and light stopping areas of a width corresponding, respectively, to the width and twice the width of one of said filters.

8. In a device as claimed in claim 7, including a light diffusing cylinder concentrically enclosing said shutter.

MORRIS KAMM KUNINS.

REFERENCES CITED

The following references are of record in the file of this patent:

UNITED STATES PATENTS

| Number | Name | Date |
|---|---|---|
| 1,351,375 | D'Humy | Aug. 31, 1920 |
| 1,711,303 | Berry | Apr. 30, 1929 |
| 1,880,230 | Beck | Oct. 4, 1932 |
| 1,991,775 | Spencer | Feb. 19, 1935 |
| 2,265,980 | Berger | Dec. 16, 1941 |
| 2,272,646 | Schmidt et al. | Feb. 10, 1942 |
| 2,281,790 | Newball | May 5, 1942 |
| 2,303,196 | Busse | Nov. 24, 1942 |

FOREIGN PATENTS

| Number | Country | Date |
|---|---|---|
| 304,854 | Great Britain | Jan. 31, 1939 |
| 326,488 | Great Britain | Mar. 10, 1930 |
| 396,790 | Great Britain | 1933 |
| 141,681 | Switzerland | 1930 |